June 7, 1949.   F. P. STINCHCOMB   2,472,270
PORTABLE DRILL PRESS HOLDER
Filed Oct. 19, 1945

Inventor
FRANKLIN P. STINCHCOMB.
By Howard J. Whelan.
Attorney

Patented June 7, 1949

2,472,270

UNITED STATES PATENT OFFICE 2,472,270

PORTABLE DRILL PRESS HOLDER

Franklin P. Stinchcomb, Baltimore, Md.

Application October 19, 1945, Serial No. 623,257

2 Claims. (Cl. 77—7)

This invention relates to drilling machinery more particularly to a holding device for operating a portbale drill under difficult circumstances, in a structural iron building.

Several methods have been employed in the handling of portable drills on building work. Most of them require a clamp or a chain that is wound around a beam and used to hold the drill in place while it is directly manipulated to force the drill being used to cut in further.

It is an object of this invention to provide a new and improved holder unit for a portable drill that will avoid one or more of the disadvantages and limitations of the prior art.

Another object of this invention is to provide a new and improved holder unit for a portable drill that can be attached automatically and securely to an iron beam or other ferrous surface and employed to force the drilling operation to be conveniently done in the manner and extent desired by the user.

For a better understanding of the invention and for other objects thereof reference is made to the drawings and description provided, while the scope of the invention is particularly pointed out in the claims.

Referring to the drawings.

Similar reference characters pertain to similar parts throughout the drawings.

Figure 1:
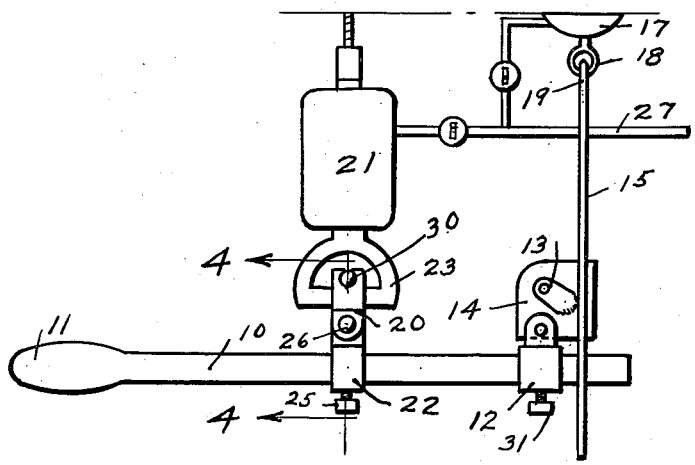
Figure 1 is a side elevation of a portable drill holder unit embodying this invention, with the portable drill attached to indicate the manner of its use.
Figure 2:
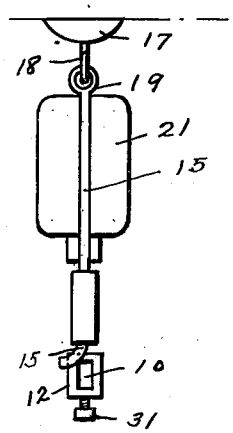
Figure 2 is a side view of Figure 1.
Figure 3:
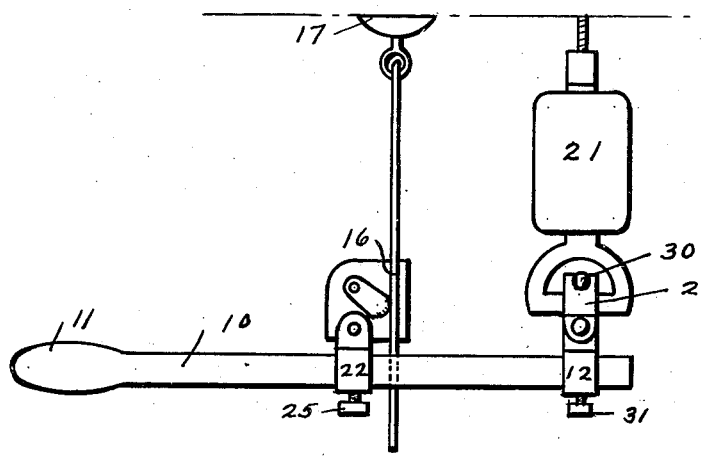
Figure 3 shows rearrangement of parts to drill holes in corners etc.

The holder unit structure of this invention consists of a trammel bar 10 of uniform rectangular cross-section and relatively long to afford ample manipulation facility and leverage in its use. One end portion 11 is made of a size and form suitable for manual and non-slipping operation, as indicated. The opposite end portion, has a slip clamp mechanism 12 and 13 respectively formed on a guide and holding plate 14, to produce a cam-like reaction and clamping on a flexible steel cable 15 passing through a channel 16 in it, as indicated in the drawings. The part 12 slides longitudinally on trammel bar 10 and is tightened thereon by set screw 31.

The cable 15 continues for some length and terminates in an electromagnetic support 17 attached to its end. The attachment of this end is made through an eye 18 in a hinged link 19. A cradle for holding a portable motor drill 21 is formed with a member 20 arranged to securely hold the handle 23 of the drill by bolt 30, but permit a predetermined amount of adjustment thereon, by reason of its swinging hinge 24. The member 22 is formed internally to suit the cross-section of the trammel bar 10 so that it can slide longitudinally thereon. It has a set screw 25 passing transversely through it to permit tightening of the member at any location on the bar, while the swing hinge 24 can be controlled by a bolt 26 passing through it.

Service supply conductors 27, provide electric current to the electromagnetic support 17 and the motor drill 21, simultaneously, but each part 17 and 21 is separately controllable by a separate switch for each. If preferred, the conductor for the electro-magnet may be run through the steel cable 15 in a particular way, and feed the electromagnet in a protected manner.

Figure 4:
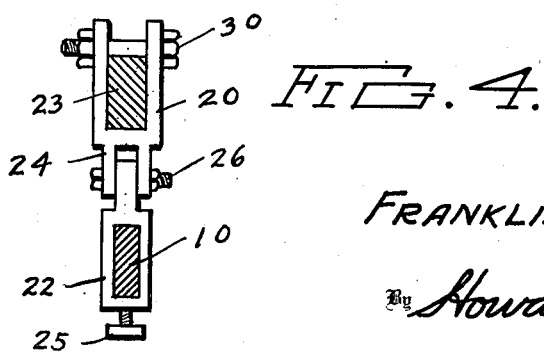
Figure 4 is a sectional view taken along line 4—4 of Figure 1.

In its use, the electro-magnet support 17, is magnetically attached to an iron beam or other metallic part of the ceiling, by closing the appropriate switch after the support is placed against the beam. The cable 15 is adjusted in the slip clamp mechanism 13 somewhat like a clothesline clamp until it has brought the trammel bar end portion on which it is situated into the required position in a vertical plane. In this position the trammel bar becomes a lever for raising and lowering the motor drill 21 with the rope attachment forming the fulcrum. The portable drill 21 is then adjustably positioned by sliding the member 22 on the bar 10 and locking it in place with the screw 25. Then the drill is started, and the user with one hand against the motor drill 21 to guide it and the other pressing on the handle 11 exerts the leverage and force on the turning drill tool in the motor drill 21 acting on the beam or work above, as indicated in Figures 1 and 4 does the drilling desired. After the drilling, the operator shuts off the motor 21 and the power to the electromagnetic support, and removes them to another location, as a unit. The clamp 13 is loosened from its wedge-like hold on the cable 15 by moving it in a clockwise manner. This relieves the cable from the teeth of clamp and the pressure against the guide surface 16.

The arrangement is of compart and light structure, it works expeditiously and effectively, and it has all the adjustments desirable in a device of this nature. It is relatively flexible and resilient by reason of the use of the cable. The cable 15 by reason of its flexibility, as well as that of the eye 18 and hinged link 19 is of particular value in the use of the motor drill, in that it allows the latter and the handle mechanism connected with it, to be tilted from the vertical and thereby permit angular holes to be drilled, just as conveniently. The term cable used in the specifications is intended to be comprehensive enough to include rope and other flexible items of a similar nature.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. In combination with an electric motor including a tool operated thereby, of a magnetic supporting unit comprising in combination, a magnetic device for magnetic attachment to a ferrous object horizontally positioned and including an eye and flexible link suspended therefrom, a cable coupled to said link and adapted to extend vertically down therefrom, a slip clamp mechanism mounted on said cable and including a holding plate with a wedgelike acting member and guide opposing it for tightening on the cable as the mechanism is tensioned away from the said device, a trammel bar including a handle at one end adjustably attached to said plate for positioning the latter relatively to said cable and forming a fulcrum point for the bar, an adjustable member slidable on said bar and including a flexible connection for fastening it to a portion of said motor, said member and handle being so positioned with respect to said portion of the motor as to enable the use of the unit to exert pressure under leverage by said handle with the cable and clamp as fulcrum to said motor and thereby facilitate the action of said tool, and electrical connections for said motor.

2. In combination with an electric motor including a tool operated thereby, of an electromagnetic supporting unit comprising in combination, an electromagnetic device for magnetic support to a ferrous beam or the like horizontally positioned and including an eye and flexible link suspended therefrom, a cable coupled to said link and adapted to extend vertically down therefrom, a slip clamp mechanism mounted on said cable and including a holding plate with a wedgelike acting member and guide opposing it for tightening on the cable as the mechanism is tensioned away from the said device, a trammel bar including a handle at one end adjustably attached to said plate for positioning the latter relatively to said cable and forming a fulcrum point for the bar, an adjustable member slidable on said bar and including a flexible connection for fastening it to a portion of said motor for manipulating same said member and handle being so positioned with respect to said portion of the motor as to enable the user of the unit to exert pressure under leverage with said trammel bar with the cable and clamp as fulcrum onto said motor and thereby facilitate the action of said tool in its work while said device supports said mechanism and motor from said beam and conductors coupling said motor and device to a source of power for energizing them.

FRANKLIN P. STINCHCOMB.

REFERENCES CITED

The following references are of record in the file of this patent:

UNITED STATES PATENTS

| Number | Name | Date |
|---|---|---|
| 1,010,975 | Stroner et al. | Dec. 5, 1911 |
| 1,097,709 | Fosselman | May 26, 1914 |
| 1,763,552 | Cook | June 10, 1930 |
| 2,374,875 | McMurphy | May 1, 1945 |